(12) United States Patent
Ogawa

(10) Patent No.: US 8,499,920 B2
(45) Date of Patent: Aug. 6, 2013

(54) CONVEYOR DEVICE

(75) Inventor: Kazuhiko Ogawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 77 days.

(21) Appl. No.: 13/262,280

(22) PCT Filed: Mar. 26, 2010

(86) PCT No.: PCT/JP2010/002184
§ 371 (c)(1),
(2), (4) Date: Sep. 30, 2011

(87) PCT Pub. No.: WO2010/113449
PCT Pub. Date: Oct. 7, 2010

(65) Prior Publication Data
US 2012/0024663 A1    Feb. 2, 2012

(30) Foreign Application Priority Data

Apr. 3, 2009   (JP) ................................. 2009-090619

(51) Int. Cl.
*B65G 43/08* (2006.01)

(52) U.S. Cl.
USPC ........................ 198/358; 198/437; 198/370.01

(58) Field of Classification Search
USPC .................. 198/370.01, 370.02, 370.03, 358, 198/349, 349.5, 437
See application file for complete search history.

(56) References Cited

U.S. PATENT DOCUMENTS

| | | | | |
|---|---|---|---|---|
| 3,799,319 A | * | 3/1974 | Cutler et al. ................... | 198/416 |
| 4,029,194 A | * | 6/1977 | Feurstein et al. ............. | 198/358 |
| 4,053,741 A | * | 10/1977 | Ainoya et al. ................ | 198/358 |
| 4,770,122 A | * | 9/1988 | Ichihashi et al. ............. | 198/349 |
| 5,460,257 A | * | 10/1995 | Yoshida ........................ | 198/358 |
| 6,314,337 B1 | * | 11/2001 | Marcum ........................ | 198/358 |
| 7,066,315 B2 | * | 6/2006 | Tanaka .......................... | 198/349 |
| 7,954,621 B2 | * | 6/2011 | Brandt et al. ................. | 198/349 |
| 8,060,243 B2 | * | 11/2011 | Ogawa .......................... | 198/358 |
| 8,245,834 B2 | * | 8/2012 | Okubo et al. ................. | 198/358 |

FOREIGN PATENT DOCUMENTS

| | | |
|---|---|---|
| JP | 58-123188 A | 7/1983 |
| JP | 3-267239 A | 11/1991 |
| JP | 9-248523 A | 9/1997 |

(Continued)

OTHER PUBLICATIONS

Official Communication issued in International Patent Application No. PCT/JP2010/002184, mailed on Jun. 29, 2010.
English translation of Official Communication issued in corresponding International Application PCT/JP2010/002184, mailed on Nov. 24, 2011.

*Primary Examiner* — James R Bidwell
(74) *Attorney, Agent, or Firm* — Keating & Bennett, LLP

(57) ABSTRACT

In a conveyor device including a branch path, the number of articles sorted to the branch path is counted accurately. The conveyor device conveys a plurality of articles and includes a main conveyor, a first branch path, a first detector, a second detector, a detection information processing section, and a charging conveyor. The first branch path branches from the main conveyor at a first branch point. The first detector and the second detector are arranged upstream and downstream, respectively, of the branch point along a conveyance direction and are arranged to detect articles on the main conveyor. The detection information processing section is configured to calculate the number of articles sorted to the first branch path based on a difference between the number of articles detected by the first detector and the number of articles detected by the second detector.

15 Claims, 3 Drawing Sheets

FOREIGN PATENT DOCUMENTS

| | | |
|---|---|---|
| JP | 2001-034839 A | 2/2001 |
| JP | 2002-160803 A | 6/2002 |
| JP | 2003-026322 A | 1/2003 |
| JP | 2006-36452 A | 2/2006 |

* cited by examiner

CONVEYOR DEVICE

BACKGROUND OF THE INVENTION

1. Field of the Invention

The present invention relates to a conveyor device. More particularly, the present invention relates to a conveyor device that includes a branch path connected to a main conveyor and is configured to enable a person to perform sorting work by hand.

2. Description of the Related Art

A conveyor device is used to sort articles at a delivery center, a distribution base, or a factory. The conveyor device is, for example, a belt conveyor and includes a main conveyor (main line) and a plurality of branch paths (chutes) that branch from the main conveyor.

Articles are fed to the main conveyor and the articles are sorted to the different branch paths. One method of sorting is to use an automatic sorting machine. However, articles that are not suitable for the automatic sorting machine (i.e., articles that cannot be identified automatically because they are not compliant with a standard and articles comprising breakable items or valuable items that have been packaged) are sorted by hand. Hereinafter, such a conveyor device is called a hand sorting conveyor device.

More specifically, with a hand sorting conveyor device, a worker is stationed near a branch point of a branch path, and when an appropriate article is conveyed on the main conveyor, the worker moves the article to the branch path. In this way, articles are sorted to corresponding branch paths (e.g., see Japanese Laid-open Patent Publication No. 2006-36452).

A detector is provided on each of the branch paths. Each of the detectors is a photoelectric sensor or a limit switch. Types of photoelectric sensors that may be used are through-beam, mirror reflective, and diffuse reflective type sensors. When an article passes by the detector, the detector detects an on/off transition of a signal, and a control section counts the number of on/off transitions as the number of sorted articles. Counted numbers of articles are indicated on a sort count monitor provided on each of the branch paths. In this way, sorting performance management, progress management, and productivity management may be conducted.

However, with a conventional conveyor device, miscounts occur easily for reasons that will now be explained.

Firstly, if a worker moves a plurality of articles lumped together to a branch path, the number of articles counted by the detector will be smaller than the actual number of articles sorted.

Secondly, if the worker performs a movement that affects the detection of the detector (e.g., if the worker's hand blocks the light of the detector), the number of articles counted by the detector will be larger than the actual number of articles sorted.

Thirdly, if a branch becomes full or if an article jam occurs, such that articles become stagnant on the branch path, the detector will remain in an on-state. Thus, the detector cannot detect an article properly.

SUMMARY OF THE INVENTION

Preferred embodiments of the present invention provide a conveyor device including a branch path in which the number of articles sorted to the branch path can be counted accurately.

A plurality of preferred embodiments of the present invention for solving the aforementioned problems will now be explained. The various preferred embodiments of the present invention can be combined freely as necessary.

A conveyor device according to a preferred embodiment of the present invention is a conveyor device for conveying a plurality of articles and preferably includes a main conveyor, a branch path, a first detector, a second detector, and a calculating section. The main conveyor is a device that conveys articles. The branch path branches from a branch point along the main conveyor. The first detector and the second detector are provided upstream and downstream, respectively, of the branch point of the branch path along a conveyance direction and are arranged to detect articles on the main conveyor. The calculating section is configured to calculate the number of articles that have been sorted to the branch path based on the difference between the number of articles detected by the first detector and the number of articles detected by the second detector.

With this device, the articles are conveyed by the main conveyor and detected by the first detector. A worker sorts articles to the branch path as necessary. Articles not sorted to the branch path are further conveyed by the main conveyor and detected by the second detector. The calculating section is configured to calculate the number of articles that have been sorted to the branch path based on a difference between the number of articles detected by the first detector and the number of articles detected by the second detector.

With this device, a state of articles on the branch path does not affect the first detector or the second detector because what is detected by the detectors is the number of articles conveyed by the main conveyor. Consequently, in a hand sorting conveyor device including a branch path, the number of articles sorted to the branch path can be counted accurately.

It is preferable to further provide a device arranged upstream of the branch point in the conveying direction and configured to regulate a spacing between a plurality of articles on the main conveyor. In such a case, initially, the spacing regulating device appropriately regulates a conveyance spacing between articles conveyed by the main conveyor.

It is preferable to further provide a display section configured to display the number of articles sorted to the branch path.

It is preferable to further provide a movement amount acquiring section to acquire a movement amount of the main conveyor and to configure the calculating section to compare estimated positions of an article detected by the first detector and the second detector based on the movement amount of the main conveyor and to determine the difference between the number of articles detected by the first detector and the number of articles detected by the second detector based on a result of the comparison.

With this device, a difference between the number of articles detected by the first detector and the number of articles detected by the second detector is determined based on a comparison of estimated positions of the articles detected by the first detector and the second detector. That is, an article determined not to be present based on the comparison is understood to have been sorted to the branch path. In this way, the number of articles sorted to the branch path can be obtained in real time. Consequently, the calculated number of articles is useful for checking work progress. If only a difference between the number of articles detected by the first detector and the number of articles detected by the second detector is used, then an effect imposed by the number of articles being conveyed on the main conveyor between the two detectors cannot be removed and, thus, the number of articles sorted to the branch path cannot be obtained accurately in real time.

Here, obtaining the number of sorted articles in real time means being able to obtain the number of sorted articles while a sorting process is in progress. For example, the number of articles that have been sorted can be obtained, for example, about 5 to 10 seconds after the articles have actually been sorted to the branch path. In other words, inaccuracies in the number of articles sorted to the branch path can be prevented, e.g., a situation in which an article detected by the first detector but not detected by the second detector is counted as a sorted article even though it was not sorted to the branch path can be prevented.

It is preferable for the difference between the number of articles detected by the first detector and the number of articles detected by the second detector to be determined based on a mismatch between an estimated position of an article detected by the first detector and an estimated position of an article detected by the second detector and for the estimated positions to be located downstream of the second detector along the conveyance direction.

A conveyor device according to another preferred embodiment of the present invention is a conveyor device that conveys a plurality of articles and includes a main conveyor, a plurality of branch paths, a plurality of detectors, and a calculating section. The main conveyor conveys articles. The branch paths branch from a plurality of branch points along the main conveyor. The detectors are provided on an upstream side or a downstream side of each of the branch points along a conveyance direction and are arranged to detect the articles on the main conveyor. The calculating section is configured to calculate the number of articles that have been sorted to each of the branch paths based on a difference between numbers of articles detected by a pair of adjacent detectors arranged upstream and downstream of one of the branch points along the conveyance direction.

With this device, the articles are conveyed by the main conveyor and detected by the detectors arranged on the upstream sides of the branch points. A worker sorts articles to the branch paths as necessary. Articles not sorted to a branch path are further conveyed by the main conveyor and detected by a detector arranged downstream of the branch points along the conveyance direction. The calculating section calculates the number of articles sorted to a branch path based on a difference between the number of articles detected by a pair of detectors.

With this device, a state of articles on a branch path does not affect the pair of detectors because the detectors actually detect articles conveyed by the main conveyor. Consequently, in a hand sorting conveyor device including a branch path, the number of articles sorted to the branch path can be counted accurately.

With this preferred embodiment, it is possible to have one detector arranged between adjacent branch paths such that one detector functions as both an upstream detector and a downstream detector and the number of detectors can be reduced.

It is preferable to further provide a device arranged upstream in a conveying direction from the most upstream branch point and configured to regulate a spacing between a plurality of articles on the main conveyor.

It is preferable to further provide a plurality of display sections configured to display the number of articles sorted to each of the branch paths.

It is preferable to further provide a movement amount acquiring section to acquire a movement amount of the main conveyor and to configure the calculating section to compare estimated positions of an article detected by each detector of a pair of adjacent detectors based on a movement amount of the main conveyor and to determine the difference between numbers of articles detected by the two adjacent detectors based on a result of the comparison.

It is preferable for the difference between the numbers of articles detected by the pair of adjacent detectors to be determined based on a mismatch between estimated positions of an article detected by the pair of adjacent detectors and for the estimated positions to be located downstream along the conveyance direction from the more downstream detector of the pair of adjacent detectors.

A conveyor device according to still another preferred embodiment of the present invention is a device that conveys a plurality of articles and includes a main conveyor, a branch path, a first detector, a second detector, and a calculating section. The main conveyor conveys articles. The branch path branches from a branch point along the main conveyor. The first detector and the second detector are arranged to detect articles on the main conveyor. The first detector is provided upstream of the branch point and the second detector is provided downstream of the branch point along a conveyance direction. The calculating section is configured to calculate the number of articles that have been sorted to the branch path. Based on a movement amount of the main conveyor, the calculating section obtains a first estimated position information for when an article detected by the first detector is downstream of the second detector in the conveyance direction and a second estimated position information for when an article detected by the second detector is downstream of the second detector in the conveyance direction. The calculating section compares the first estimated position information and the second estimated position information and determines that an article has been sorted to the branch path if a second estimated position information corresponding to the first estimated position information does not exist.

With this device, the articles are initially conveyed by the main conveyor and detected by the first detector. A worker sorts articles to the branch path as necessary. Articles not sorted to the branch path are further conveyed by the main conveyor and detected by the second detector. The calculating section is configured to calculate the number of articles that have been sorted to the branch path.

With this device, the calculating section determines that an article has been sorted to the branch path when a first estimated position information exists for the article but a corresponding second estimated position information does not exist. In this way, the number of articles sorted to the branch path can be obtained in real time. Consequently, the calculated number of articles is useful for checking work progress. If simply a difference between the number of articles detected by the first detector and the number of articles detected by the second detector is used, then an effect imposed by the number of articles being conveyed on the main conveyor between the first detector and the second detector cannot be eliminated and, thus, the number of articles sorted to the branch path cannot be obtained accurately in real time.

It is preferable to further provide a device arranged upstream of the branch point in the conveyance direction and configured to regulate a spacing between a plurality of articles on the main conveyor.

It is preferable to further provide a first memory to store the first estimated position information and a second memory to store the second estimated position information and to configure the calculating section such that it compares the first estimated position information and the second estimated position information by comparing the content of the first memory and the content of the second memory.

With this device, the calculating section can obtain the number of articles sorted to the branch path in real time by comparing the content of the first memory and the content of the second memory. Consequently, the calculated number of articles is useful for checking work progress.

It is preferable for the first memory and the second memory to include an equal number of bits that corresponds to a prescribed distance downstream from the second detector in the conveyance direction.

It is also preferable if the calculating section is configured to store the first estimated position information of an article in the first memory and to shift the stored first estimated position information according to a movement amount of the main conveyor; the calculating section is configured to store the second estimated position information of an article in the second memory and to shift the stored second estimated position information according to a movement amount of the main conveyor; and the calculating section is configured to determine if a second estimated position information corresponding to a first estimated position information exists by comparing corresponding bits of the first memory and the second memory.

With this device, the calculating section stores information regarding an article in a memory and shifts the information regarding the article according to a movement amount of the main conveyor. Therefore, the calculating section can constantly compare the existence of an article based on the first memory and the second memory. In this way, the number of articles sorted to the branch path can be obtained in real time. Consequently, the calculated number of articles is useful for checking work progress.

It is preferable to further provide a display section configured to display the number of articles sorted to the branch path.

A conveyor device according to various preferred embodiments of the present invention can accurately count the number of articles sorted to a branch path.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
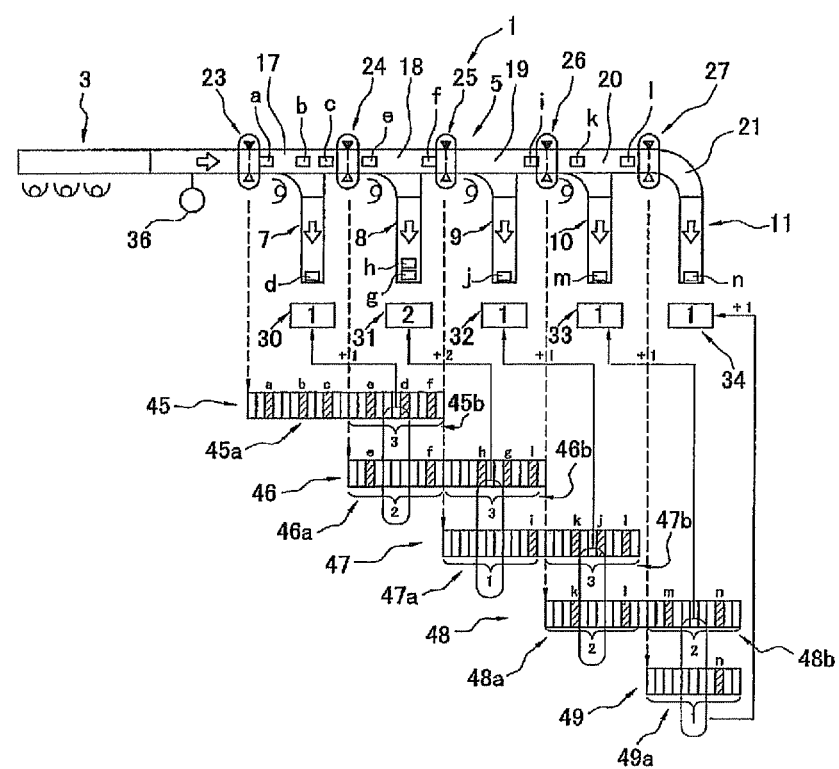
FIG. 1 is a simplified schematic view of a conveyor device according to a preferred embodiment of the present invention.

A conveyor device 1 will now be explained with reference to FIG. 1. FIG. 1 is a simplified schematic view of a conveyor device according to a preferred embodiment of the present invention.

The conveyor device 1 is a hand sorting conveyor device configured to enable a worker to perform sorting in accordance with a specified standard while a plurality of articles are being conveyed from an upstream side to a downstream side.

The conveyor device 1 preferably includes a charging conveyor 3, a main conveyor 5, and a plurality of branch paths (7, 8, 9, 10, and 11).

The charging conveyor 3 is, for example, a belt conveyor for a worker to load articles. It is also acceptable for a robot to load articles instead of a worker.

The main conveyor 5 is a conveyor that carries articles automatically. The main conveyor 5 is, for example, a belt conveyor. The main conveyor 5 is arranged such that it joins the charging conveyor 3 uninterruptedly and, in this preferred embodiment, extends in a linear fashion.

Figure 3:
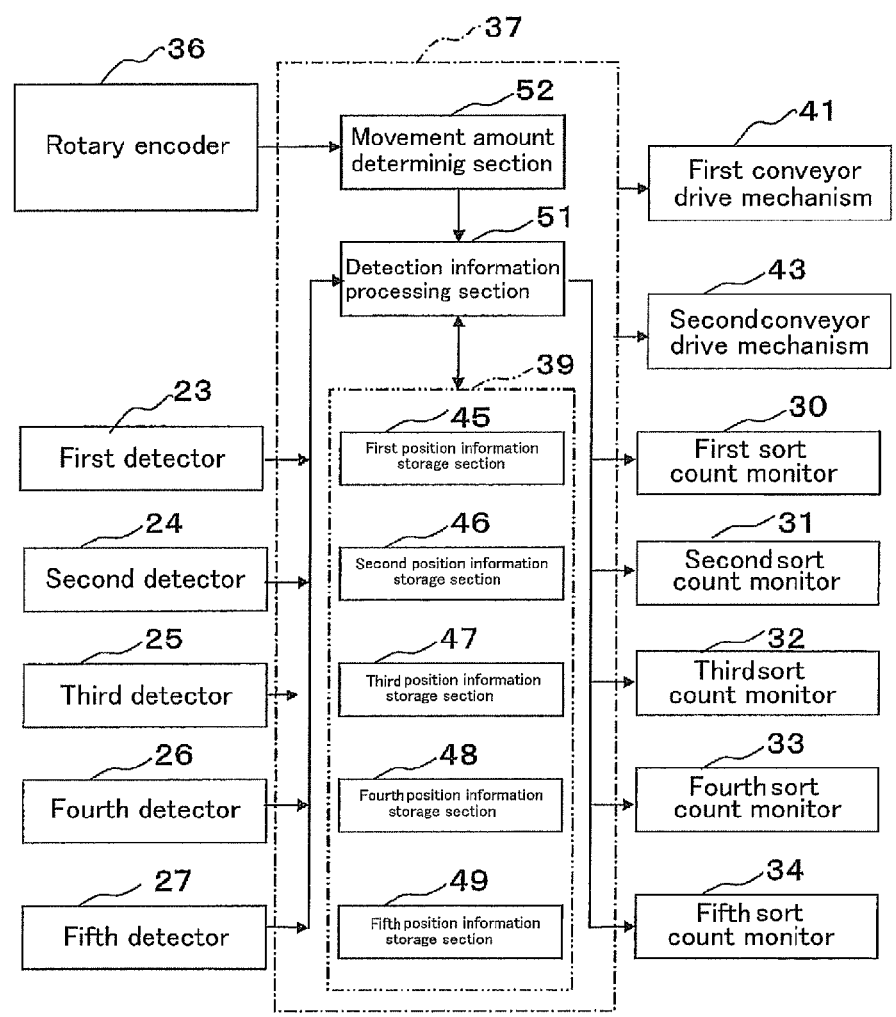
FIG. 3 is a block diagram showing control features of a conveyor device according to a preferred embodiment of the present invention.

Each of the charging conveyor 3 and the main conveyor 5 includes a separate drive motor (not shown) and the drive motors are driven by a first conveyor drive mechanism 41 or a second conveyor drive mechanism 43 (FIG. 3).

The plurality of branch paths (7, 8, 9, 10, 11) branch from the main conveyor 5. The branch paths (7, 8, 9, 10, 11) include, for example, roller conveyors, and are arranged to branch from a plurality of branch points (17, 18, 19, 20, 21) along the main conveyor 5.

More specifically, the conveying surfaces of the branch paths (7, 8, 9, 10, 11) are slanted such that each of them becomes lower as one moves away from the main conveyor 5 and articles are carried into the branch path due their own weight.

A worker is stationed near each of the branch points, and each of the workers serves to identify articles conveyed by the main conveyor 5 and pull articles corresponding to the branch path that the worker is in charge of.

More specifically, from the upstream side, a first branch path 7 branches from a first branch point 17, a second branch path 8 branches from a second branch point 18, a third branch path 9 branches from a third branch point 19, a fourth branch path 10 branches a fourth branch point 20, and a fifth branch path 11 branches from a fifth branch point 21.

The conveyor device 1 also includes a plurality of detectors (23, 24, 25, 26, 27). The detectors (23, 24, 25, 26, 27) are arranged to detect the number of articles passing by as the articles are being carried by the main conveyor 5. The detectors (23, 24, 25, 26, 27) are provided along the main conveyor 5 and arranged in positions where misdetection is not likely to occur due to movements of a sorting worker.

In this preferred embodiment, the detectors preferably are, for example, through-beam type photoelectric sensors, each including a light projecting device and a light receiving device. However, it is acceptable to use another type of photoelectric sensor or a limit switch.

More specifically, in order from the upstream side of the main conveyor 5 to the downstream side, a first detector 23 is provided upstream of the first branch point 17, a second detector 24 is provided downstream of the first branch point 17 and upstream of the second branch point 18, a third detector 25 is provided downstream of the second branch point 18 and upstream of the third branch point 19, a fourth detector 26 is provided downstream of the third branch point 19 and upstream of the fourth branch point 20, and a fifth detector 27 is provided downstream of the fourth branch point 20 and upstream of the fifth branch point 21.

The conveyor device 1 also includes a plurality of sort count monitors (30, 31, 32, 33, 34). The sort count monitors (30, 31, 32, 33, 34) (explained later) serve to indicate the numbers of articles sorted to the branch paths (7, 8, 9, 10, 11) in real time. More specifically, a first sort count monitor 30 is arranged to be associated with the first branch path 7, a second sort count monitor 31 is arranged to be associated with the second branch path 8, a third sort count monitor 32 is arranged to be associated with the third branch path 9, a fourth sort count monitor 33 is arranged to be associated with the fourth branch path 10, and a fifth sort count monitor 34 is arranged to be associated with the fifth branch path 11.

The conveyor device 1 also includes a rotary encoder 36. The rotary encoder 36 is a device arranged to detect a conveyance speed of the main conveyor 5.

Control features of the conveyor device 1 will now be explained with reference to FIG. 3. FIG. 3 is a block diagram showing control features of a conveyor device according to a preferred embodiment of the present invention.

The control section 37 preferably is a computer including a CPU, a RAM, and a ROM, and is configured to perform control operations by executing a prescribed program. The control section 37 preferably includes a detection information processing section 51, a movement amount determining section 52, and a memory 39. The movement amount determining section 52 determines a movement amount of the main conveyor 5 based on signals received from the rotary encoder 36.

The first detector 23, the second detector 24, the third detector 25, the fourth detector 26, and the fifth detector 27 are connected to the control section 37, and signals from the detectors are fed to the control section 37.

Additionally, the first conveyor drive mechanism 41, the second conveyor drive mechanism 43, the first sort count monitor 30, the second sort count monitor 31, the third sort count monitor 32, the fourth sort count monitor 33, and the fifth sort count monitor 34 are connected to the control section 37 and receive control signals from the control section 37.

The structure of the memory 39 will now be explained.

Figure 2:
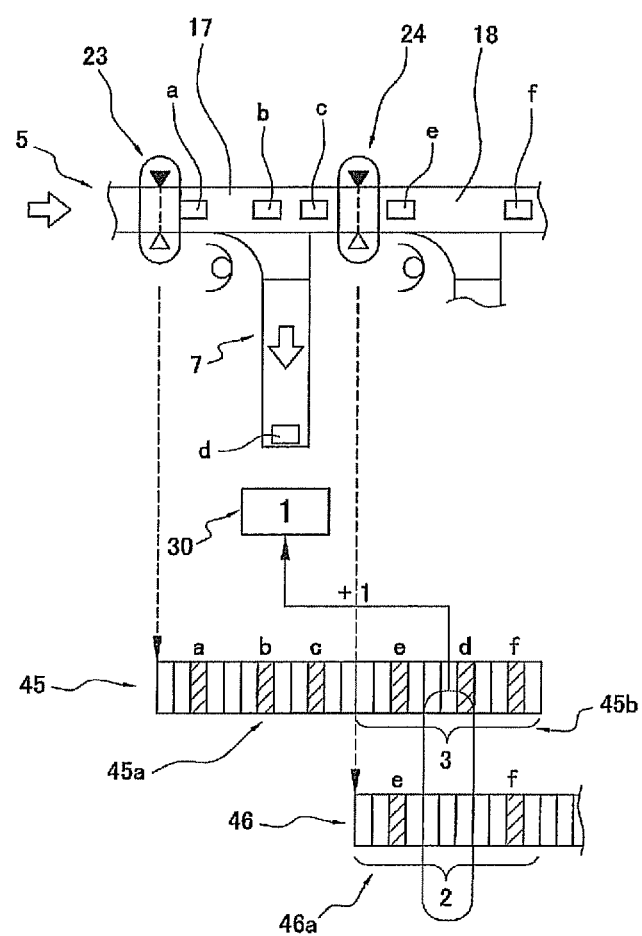
FIG. 2 is an enlarged view of a portion of FIG. 1 and serves to explain operations for calculating the number of articles sorted to a first branch path using a first detector and a second detector.

As shown in FIGS. 1 and 2, the memory 39 includes a plurality of position information storage sections (45, 46, 47, 48, 49). FIG. 2 is an enlarged view of a portion of FIG. 1 and serves to explain operations to calculate the number of articles sorted to a first branch path using a first detector and a second detector. The position information storage sections (45, 46, 47, 48, 49) are devices (explained later) that store conveyance positions of articles detected by the detectors (23, 24, 25, 26, 27) in real time.

More specifically, a first position information storage section 45 is provided to be associated with the first detector 23, a second position information storage section 46 is provided to be associated with the second detector 24, a third position information storage section 47 is provided to be associated with the third detector 25, a fourth position information storage section 48 is provided to be associated with the fourth detector 26, and a fifth position information storage section 49 is provided to be associated with the fifth detector 27.

Each of the position information storage sections (45, 46, 47, 48, 49) includes a first memory portion, which stores position information of articles located between the detector corresponding to the position information storage section and a detector arranged immediately downstream, and a second memory portion, which stores position information of articles located between the aforementioned downstream detector and a detector located still further downstream. The fifth position information storage section 49 includes only a first memory portion.

Each of the first memory portions and the second memory portions preferably includes a plurality of bits. In this preferred embodiment, the first memory portions preferably include twelve bits and the second memory portions also preferably include twelve bits, for example. A bit having a value of 0 indicates that an article does not exist, and a bit having a value of 1 indicates that an article exists.

More specifically, the first position information storage section 45 includes a first memory portion 45a and a second memory portion 45b. The first memory portion 45a corresponds to a distance between the first detector 23 and the second detector 24, and the second memory portion 45b corresponds to a distance between the second detector 24 and the third detector 25.

The second position information storage section 46 includes a first memory portion 46a and a second memory portion 46b. The first memory portion 46a corresponds to a distance between the second detector 24 and the third detector 25, and the second memory portion 46b corresponds to a distance between the third detector 25 and the forth detector 26.

The third position information storage section 47 includes a first memory portion 47a and a second memory portion 47b. The first memory portion 47a corresponds to a distance between the third detector 25 and the fourth detector 26, and the second memory portion 47b corresponds to a distance between the fourth detector 26 and the fifth detector 27.

The fourth position information storage section 48 includes a first memory portion 48a and a second memory portion 48b. The first memory portion 48a corresponds to a distance between the fourth detector 26 and the fifth detector 27, and the second memory portion 48b corresponds to a distance from the fifth detector 27 to a prescribed position downstream.

The fifth position information storage section 49 preferably only includes a first memory portion 49a. The first memory portion 49a corresponds to a distance from the fifth detector 27 to a prescribed position downstream As explained previously, the second memory portion 45b of the first position information storage section 45 and the first memory portion 46a of the second position information storage section 46 correspond to each other, the second memory portion 46b of the second position information storage section 46 and the first memory portion 47a of the third position information storage section 47 correspond to each other, the second memory portion 47b of the third position information storage section 47 and the first memory portion 48a of the fourth position information storage section 48 correspond to each other, and the second memory portion 48b of the fourth position information storage section 48 and the first memory portion 49a of the fifth position information storage section 49 correspond to each other.

A loading worker loads articles onto the charging conveyor 3, and the articles are conveyed by the charging conveyor 3 and the main conveyor 5. The charging conveyor 3 appropriately regulates a conveyance spacing between articles conveyed by the main conveyor 5. Thus, the detectors (23, 24, 25, 26, 27) can detect the number of articles accurately. As a result, the number of articles sorted to a branch path can be obtained accurately.

Each of the sorting workers at the branch points sorts articles to be sorted to the branch path that he/she is in charge of. The passage of the articles on the main conveyor 5 is detected by detectors (23, 24, 25, 26, 27)

With this conveyor device, the detection information processing section 51 of the control section 37 calculates the number of articles sorted to the first branch path 7 by subtracting the number of articles detected by the second detector 24 from the number of articles detected by the first detector 23. The detection information processing section 51 calculates the number of articles sorted to the second branch path 8 by subtracting the number of articles detected by the third detector 25 from the number of articles detected by the second detector 24. The detection information processing section 51 calculates the number of articles sorted to the third branch path 9 by subtracting the number of articles detected by the fourth detector 26 from the number of articles detected by the third detector 25. The detection information processing section 51 calculates the number of articles sorted to the fourth branch path 10 by subtracting the number of articles detected by the fifth detector 27 from the number of articles detected by the fourth detector 26. The detection information processing section 51 calculates the number of articles sorted to the fifth branch path 11 based on the number of articles detected by the fifth detector 27.

Since the detectors (23, 24, 25, 26, 27) detect articles carried on the main conveyor 5, the states of articles on the branch paths (7, 8, 9, 10, 11) do not adversely affect the detection by the detectors (23, 24, 25, 26, 27). Consequently, in a hand sorting conveyor device including a branch path, the number of articles sorted to the branch path can be detected accurately.

As will now be explained, the detection information processing section 51 counts the numbers of articles sorted to the branch paths and indicates the numbers of articles sorted on the sort count monitors in real time.

When an article passes by and the first detector 23 detects an ON and an OFF, the detection information processing section 51 changes a first bit in the first position information storage section 45 from "0" to "1." In FIG. 1, a value of "1" is indicated with hatching. Then, the movement amount determining section 52 calculates a movement amount of the main conveyor 5 based on speed information from the rotary encoder 36, and sends the calculated movement amount to the detection information processing section 51. The detection information processing section 51 shifts the "1" in the first position information storage section 45 based on the movement amount of the main conveyor 5. Thus, the "1" in the first position information storage section 45 corresponds to the position of the article on the main conveyor 5. A similar operation is executed at the second position information storage section 46, the third position information storage section 47, the fourth position information storage section 48, and the fifth position information storage section 49.

The operations of counting the numbers of articles sorted to the branch paths and indicating the numbers will now be explained for a state shown in FIG. 1, i.e., a sorting state in which a plurality of articles have been loaded and articles exist on the main conveyor 5 and the branch paths.

In FIG. 1, letters of the alphabet are assigned to actual articles on the conveyor device 1, and the letters assigned to the respective articles are also assigned to the corresponding 1's (indicated with hatching) in the information storage sections. Information regarding the actual articles themselves is not stored in the information storage sections.

As shown in FIG. 1, the detection information processing section 51 compares the second memory 45$b$ of the first position information storage section 45 and the first memory portion 46$a$ of the second position information storage section 46. More specifically, the detection information processing section 51 compares each bit of the two memory portions. Thus, because three bits of the former have a value of 1 and only two bits of the latter have a value of 1,the number of articles indicated by the former is one greater than the latter. This means that one of the articles that passed by the first detector 23 has been sorted at the branch point 17. Therefore, the detection information processing section 51 indicates a sort count of "1" on the first sort count monitor 30.

The detection information processing section 51 compares the memories and updates the number indicated on the first sort count monitor 30 at prescribed time intervals. The prescribed time interval is, for example, an amount of time required for an article to be conveyed from one detector to another detector. It is also acceptable if the detection information processing section 51 constantly compares the memories and updates the number indicated on the first sort count monitor 30 when it has determined that the first bit of the second memory portion 45$b$ of the first position information storage section 45 has a value 1 and the first bit of the first memory portion 46$a$ of the second position information storage section 46 has a value of 0,or if the detection information processing section 51 constantly compares the memories and updates the number indicated on the first sort count monitor 30 when it has determined that a subsequent bit (e.g., a bit among the second to fifth bits) of the second memory portion 45$b$ has a value 1 and the corresponding bit of the first memory portion 46$a$ has a value of 0.

The numbers indicated on the second sort count monitor 31, the third sort count monitor 32, and the fourth sort count monitor 33 are updated in a similar fashion.

Regarding the fifth sort count monitor 34, when the detection information processing section 51 receives a detection signal from the fifth detector 27, it updates the number indicated on the fifth sort count monitor 34 without comparing memories.

In this way, the conveyer device 1 indicates the numbers of sorted articles on the sort count monitors in real time. Consequently, the calculated numbers of articles are useful for checking work progress.

Portions of the conveyor device 1 will now be explained. Here, only the measurement of the number of articles sorted to the first branch path 7 will be explained.

The conveyor device 1 conveys a plurality of articles and preferably includes a main conveyor 5, a first branch path 7, a first detector 23, a second detector 24, and a detection information processing section 51. The main conveyor 5 conveys articles. The first branch path 7 branches from a first branch point 17 of the main conveyor 5. The first detector 23 and the second detector 24 are arranged upstream and downstream, respectively, of the first branch point 17 along a conveyance direction, and are arranged to detect articles on the main conveyor 5. The detection information processing section 51 is configured to calculate the number of articles that have been sorted to the first branch path 7 based on a difference between the number of articles detected by the first detector 23 and the number of articles detected by the second detector 24.

With this conveyor device, the articles are conveyed by the main conveyor 5 and detected by the first detector 23. A worker sorts articles to the first branch path 7 as necessary. Articles not sorted to the first branch path 7 are further conveyed by the main conveyor 5 and detected by the second detector 24. The detection information processing section 51 calculates the number of articles that have been sorted to the first branch path 7 based on a difference between the number of articles detected by the first detector 23 and the number of articles detected by the second detector 24.

With this device, the state of articles on the first branch path 7 does not affect the detection by the first detector 23 or the second detector 24 because the detectors actually detect the number of articles conveyed by the main conveyor 5. Consequently, in a hand sorting conveyor device including a branch path, the number of articles sorted to the branch path can be counted accurately.

It is acceptable to further provide a rotary encoder 36 to acquire a movement amount of the main conveyor, and to configure the detection information processing section 51 to compare estimated positions of articles detected by the first detector 23 and the second detector 24 based on the movement amount of the main conveyor and to determine a difference between the number of articles detected by the first detector 23 and the number of articles detected by the second detector 24 based on a result of the comparison.

With this conveyor device, the difference between the number of articles detected by the first detector 23 and the number of articles detected by the second detector 24 is determined based on a comparison of estimated positions of articles detected by the first detector 23 and the second detector 24. That is, an article determined not to be present based on the comparison is understood to have been sorted to the first branch path 7. In this way, the number of articles sorted to the first branch path 7 can be obtained in real time. Consequently, the calculated number of articles is useful for checking work progress. If only a simple difference between the number of articles detected by the first detector 23 and the number of articles detected by the second detector 24 is used, then an effect imposed by the number of articles being conveyed on the main conveyor 5 between the first detector 23 and the second detector 24 cannot be eliminated and, thus, the number of articles sorted to the first branch path 7 cannot be obtained accurately in real time.

Here, obtaining the number of sorted articles in real time means being able to obtain the number of sorted articles while a sorting process is in progress. For example, the number of articles that have been sorted can be obtained about five to ten seconds, for example, after the articles have actually been sorted to the branch path. In other words, inaccuracies in the number of articles sorted to the first branch path 7 can be prevented, e.g., a situation in which an article detected by the first detector 23 but not detected by the second detector 24 is counted as a sorted article even though it was not sorted to the branch path can be prevented.

The conveyor device 1 is further provided with the charging conveyor 3 located upstream of the first branch point 17 along the conveyance direction of the main conveyor 5. Since the charging conveyor 3 has a slower conveyance speed than the main conveyor 5, articles that are closely adjacent to one another on the charging conveyor 3 are separated from one another when they transition to the main conveyor 5 such that they are conveyed with a prescribed spacing in-between. In this way, the charging conveyor 3 regulates a conveyance spacing of the articles.

In this conveyor device, the charging conveyor 3 appropriately regulates the conveyance spacing between articles conveyed by the main conveyor 5. Thus, the first detector 23 and the second detector 24 can count the number of articles accurately. As a result, the number of articles sorted to the first branch path 7 can be obtained accurately.

The conveyor device 1 will now be explained in terms of other aspects of various preferred embodiments of the present invention.

The conveyor device 1 conveys a plurality of articles and preferably includes a main conveyor 5, a first branch path 7, a first detector 23, a second detector 24, and a detection information processing section 51. The main conveyor 5 conveys articles. The first branch path 7 branches from a first branch point 17 of the main conveyor 5. The first detector 23 and the second detector 24 are arranged to detect articles on the main conveyor 5 and are arranged upstream and downstream, respectively, of the branch point 17 along a conveyance direction. The detection information processing section 51 is configured to calculate the number of articles sorted to the first branch path 7. Based on a movement amount of the main conveyor 5, the detection information processing section 51 obtains a first estimated position information, for when an article detected by the first detector 23 is downstream of the second detector 24 in the conveyance direction, and a second estimated position information, for when an article detected by the second detector 24 is downstream of the second detector 24 in the conveyance direction. The detection information processing section 51 compares the first estimated position information and the second estimated position information and determines that an article has been sorted to the first branch path 7 if a second estimated position information corresponding to the first estimated position information does not exist.

With this conveyor device, the articles are conveyed by the main conveyor 5 and detected by the first detector 23. A worker sorts articles to the first branch path 7 as necessary. Articles not sorted to the first branch path 7 are further conveyed by the main conveyor 5 and detected by the second detector 24. The detection information processing section 51 calculates the number of articles sorted to the first branch path 7.

With this conveyor device, the detection information processing section 51 determines that an article has been sorted to the first branch path 7 when a first estimated position information exists for the article but a corresponding second estimated position information does not exist. In this way, the number of articles sorted to the first branch path 7 can be obtained in real time. Consequently, the calculated number of articles is useful for checking work progress. If only a simple difference between the number of articles detected by the first detector 23 and the number of articles detected by the second detector 24 is used, then an effect imposed by the number of articles being conveyed on the main conveyor 5 between the first detector 23 and the second detector 24 cannot be removed and, thus, the number of articles sorted to the first branch path 7 cannot be obtained accurately in real time.

The conveyor device 1 is further provided with a second memory portion 45b of a first position information storage section 45 to store the first estimated position information and a first memory portion 46a of a second position information storage section 46 to store the second estimated position information. The detection information processing section 51 compares the first estimated position information and the second estimated position information by comparing the second memory portion 45b of the first position information storage section 45 and the first memory portion 46a of the second position information storage section 46.

In this way, the detection information processing section 51 can obtain the number of articles sorted to the first branch path 7 in real time. Consequently, the calculated number of articles is useful for checking work progress.

The second memory portion 45b of the first position information storage section 45 and the first memory portion 46a of the second position information storage section 46 each preferably include an equal number of bits that corresponds to a prescribed distance downstream from the second detector 24 along the conveyance direction. The detection information processing section 51 is configured to store first estimated position information of an article in the second memory 45b of the first position information storage section 45 and to shift the stored first estimated position information according to a movement amount of the main conveyor 5. The detection information processing section 51 is configured to store second estimated position information of an article in the first memory portion 46a of the second position information storage section 46 and to shift the stored second estimated position information according to a movement amount of the main conveyor 5. The detection information processing section 51 then determines whether the second estimated position information corresponding to the first estimated position information exists by comparing corresponding bits of the second memory portion 45b of the first position information storage section 45 and the first memory portion 46a of the second position information storage section 46.

With this conveyor device, the detection information processing section 51 stores information regarding a detected article in a memory and shifts the information regarding the article according to a movement amount of the main conveyor 5. The detection information processing section 51 can always check the existence of an article by comparing the second memory portion 45b of the first position information storage section 45 and the first memory portion 46a of the second position information storage section 46. In this way, the number of articles sorted to the first branch path 7 can be obtained in real time. Consequently, the calculated number of articles is useful for checking work progress.

Preferred embodiments of the present invention have been explained heretofore, but the present invention is not limited to the preferred embodiments described above. Various changes can be made without departing from the scope of the present invention. In particular, the preferred embodiments and variations presented herein can be combined freely as necessary.

Instead of indicating the number of sorted articles, it is acceptable to have the sort count monitors indicate ratios of sorted articles with respect to the total number of articles. For example, if the numbers of sorted articles in respective branch paths are 25, 100, 75, 100, and 100, then the ratios can be indicated as 6.25%, 25%, 18.75%, 25%, and 25%. In this way, even if the total number is inaccurate due to error of a detector, the ratios of articles sorted to the branch paths with respect to the total number of articles can be obtained in real time. Thus, the indicated numbers are useful for managing the state of progress because the sorting trend of articles can be ascertained.

Although in the previously explained preferred embodiments a plurality of branch paths preferably branch from a main conveyor, it is acceptable if the number of branch paths is one.

Also, although in the previously explained preferred embodiments the branch paths preferably extend from one side of the main conveyor, it is acceptable for branch paths to extend from both sides.

A branch path is not limited to a roller conveyor. It is acceptable for a branch path to be a belt conveyor or a simple sloped path.

The shape and arrangement of the main conveyor is not limited to the previously explained preferred embodiments.

The article conveyance spacing regulating device is not limited to a charging conveyor. For example, it is acceptable to provide a stopper that is arranged to prohibit and allow the movement of articles on the main conveyor and allow articles to be carried to the main conveyor once per prescribed amount of time.

It is acceptable not to provide a device that obtains a movement amount of the main conveyor. For example, if the main conveyor moves at a constant speed, then such a device is less meaningful.

The present invention is not limited to using a rotary encoder to obtain a movement amount of the main conveyor. For example, a linear encoder can be used to detect the movement amount of the main conveyor directly.

Although in the previously explained preferred embodiments articles are preferably sorted by hand, the present invention can also be applied to a conveyor device that uses a machine to sort articles automatically.

Although in the previously explained preferred embodiments the explanation focuses on counting the number of sorted articles, the previously explained functions can be used to confirm whether or not an article has positively been sorted to a branch path.

Although in the previously explained preferred embodiments the number of articles sorted to a branch path preferably is indicated on an indicator device provided within the conveyor device, it is acceptable for the number of sorted articles to be transmitted to a management device through a network.

Preferred embodiments of the present invention can be applied to a conveyor device that includes a branch path connected to a main conveyor and is configured to enable sorting work to be performed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A conveyor device to convey a plurality of articles, comprising:
   a main conveyor that conveys the plurality of articles;
   a branch path that branches from a branch point of the main conveyor;
   a first detector and a second detector provided upstream and downstream, respectively, of the branch point of the branch path along a conveyance direction and arranged to detect the plurality of articles on the main conveyor; and
   a calculating section configured to calculate a number of the plurality of articles that have been sorted to the branch path based on a difference between a number of the plurality of articles detected by the first detector and a number of the plurality of articles detected by the second detector.

2. The conveyor device according to claim 1, further comprising a device arranged upstream of the branch point along the conveyance direction and configured to regulate a spacing between the plurality of articles on the main conveyor.

3. The conveyor device according to claim 1, further comprising a display section configured to display the number of the plurality of articles that have been sorted to the branch path.

4. The conveyor device according to claim 1, further comprising a movement amount acquiring section configured to acquire a movement amount of the main conveyor; wherein
   the calculating section is configured to compare estimated positions of the plurality of articles detected by the first detector and the second detector based on the movement amount of the main conveyor and to determine a difference between the number of the plurality of articles detected by the first detector and the number of the plurality of articles detected by the second detector based on a result of the comparison.

5. The conveyor device according to claim 4, wherein the difference between the number of the plurality of articles detected by the first detector and the number of the plurality of articles detected by the second detector is determined based on a mismatch between an estimated position of an article detected by the first detector and an estimated position of an article detected by the second detector, the estimated positions being located downstream of the second detector along the conveyance direction.

6. A conveyor device that conveys a plurality of articles, comprising:
- a main conveyor that conveys the plurality of articles;
- a plurality of branch paths that branch from a plurality of branch points of the main conveyor;
- a plurality of detectors provided upstream or downstream of each of the plurality of branch points along a conveyance direction and arranged to detect the plurality of articles on the main conveyor; and
- a calculating section configured to calculate a number of the plurality of articles that have been sorted to each of the plurality of branch paths based on a difference between numbers of the plurality of articles detected by a pair of adjacent detectors arranged upstream and downstream of one of the plurality of branch points along the conveyance direction.

7. The conveyor device according to claim 6, further comprising a device arranged upstream of a most upstream branch point along the conveyance direction and configured to regulate a spacing between the plurality of articles on the main conveyor.

8. The conveyor device according to claim 6, further comprising a plurality of display sections configured to indicate the number of the plurality of articles that have been sorted to each of the plurality of branch paths.

9. The conveyor device according to claim 6, further comprising a movement amount acquiring section configured to acquire a movement amount of the main conveyor; wherein
- the calculating section is configured to, based on a movement amount of the main conveyor, compare estimated positions of the plurality of articles detected by the pairs of adjacent detectors and determine the difference between the numbers of the plurality of articles detected by the adjacent detectors of each pair of adjacent detectors based on a result of the comparison.

10. The conveyor device according to claim 9, wherein a difference between the numbers of the plurality of articles detected by one of the pairs of adjacent detectors is determined based on a mismatch between estimated positions of an article detected by the one of the pair of adjacent detectors, the estimated positions being located downstream along the conveyance direction from a more downstream detector of the one of the pair of adjacent detectors.

11. A conveyor device that conveys a plurality of articles, comprising:
- a main conveyor that conveys the plurality of articles;
- a branch path that branches from a branch point of the main conveyor;
- a first detector and a second detector provided upstream and downstream, respectively, of the branch point along a conveyance direction and arranged to detect the plurality of articles on the main conveyor; and
- a calculating section configured to calculate a number of the plurality of articles that have been sorted to the branch path; wherein
- based on a movement amount of the main conveyor, the calculating section obtains a first estimated position information, for when an article detected by the first detector is downstream of the second detector in the conveyance direction, and a second estimated position information, for when an article detected by the second detector is downstream of the second detector in the conveyance direction, and the calculating section compares the first estimated position information and the second estimated position information and determines that an article has been sorted to the branch path when a second estimated position information corresponding to the first estimated position information does not exist.

12. The conveyor device according to claim 11, further comprising a device arranged upstream of the branch point along the conveyance direction and configured to regulate a spacing between the plurality of articles on the main conveyor.

13. The conveyor device according to claim 11, further comprising a display section configured to indicate the number of the plurality of articles that have been sorted to the branch path.

14. The conveyor device according to claim 11, further comprising a first memory configured to store the first estimated position information and a second memory configured to store the second estimated position information are further provided, wherein the calculating section is configured to compare the first estimated position information and the second estimated position information by comparing a content of the first memory and a content of the second memory.

15. The conveyor device according to claim 14, wherein the first memory and the second memory include an equal number of bits that corresponds to a prescribed distance downstream from the second detector in the conveyance direction;
- the calculating section is configured to store the first estimated position information of an article in the first memory and to shift the stored first estimated position information according to a movement amount of the main conveyor;
- the calculating section is configured to store the second estimated position information of an article in the second memory and to shift the stored second estimated position information according to a movement amount of the main conveyor; and
- the calculating section is configured to determine if the second estimated position information corresponding to the first estimated position information exists by comparing corresponding bits of the first memory and the second memory.

* * * * *